US012334661B2

(12) United States Patent
Tanaka et al.

(10) Patent No.: US 12,334,661 B2
(45) Date of Patent: Jun. 17, 2025

(54) CONNECTOR

(71) Applicant: Molex, LLC, Lisle, IL (US)

(72) Inventors: Daiki Tanaka, Yamato (JP); Kosuke Hariu, Yamato (JP); Takuro Akatsuka, Yamato (JP); Manabu Yamanaka, Yamato (JP)

(73) Assignee: Molex, LLC, Lisle, IL (US)

( * ) Notice: Subject to any disclaimer, the term of this patent is extended or adjusted under 35 U.S.C. 154(b) by 383 days.

(21) Appl. No.: 17/880,709

(22) Filed: Aug. 4, 2022

(65) Prior Publication Data

US 2023/0040300 A1 Feb. 9, 2023

(30) Foreign Application Priority Data

Aug. 4, 2021 (JP) ................................ 2021-128231

(51) Int. Cl.

| | |
|---|---|
| ***H01R 12/71*** | (2011.01) |
| ***H01R 12/78*** | (2011.01) |
| ***H01R 13/24*** | (2006.01) |
| *H01R 12/70* | (2011.01) |

(52) U.S. Cl.

CPC ........... *H01R 12/716* (2013.01); *H01R 12/78* (2013.01); *H01R 13/2442* (2013.01); *H01R 12/707* (2013.01)

(58) Field of Classification Search

CPC ...... H01R 12/716; H01R 12/78; H01R 12/52; H01R 12/707; H01R 13/2442

See application file for complete search history.

(56) References Cited

U.S. PATENT DOCUMENTS

| | | | | |
|---|---|---|---|---|
| 7,195,495 B2 * | 3/2007 | Takano | H01R 12/716 439/74 |
| 7,410,364 B2 * | 8/2008 | Kishi | H01R 12/716 439/570 |
| 7,985,099 B2 * | 7/2011 | Wu | H01R 12/714 439/74 |
| 8,092,232 B2 * | 1/2012 | Takeuchi | H01R 13/20 439/74 |

(Continued)

FOREIGN PATENT DOCUMENTS

| | | |
|---|---|---|
| CN | 101872922 B | 3/2013 |
| CN | 104253325 A | 12/2014 |

(Continued)

*Primary Examiner* — Thanh T Le

(57) ABSTRACT

Providing a housing including an insulating material and a terminal integrated with the housing and including a conductive material, wherein the housing includes a protrusion extending in the longitudinal direction of the connector, the terminal includes a plate portion that extends in the vertical direction, the surface thereof exposed to one side surface of the protrusion; an opposing plate portion that extends in the vertical direction, the surface thereof exposed to another side surface of the protrusion; a coupling portion that couples the upper end of the plate portion and the upper end of the opposing plate portion; and a securing portion connected to the lower end of the plate portion, and a stepped portion is formed at the boundary of the surface of the plate portion and the surface of the coupling portion and the surface of the securing portion is covered by the insulating material.

19 Claims, 13 Drawing Sheets

(56) References Cited

U.S. PATENT DOCUMENTS

| | | | | |
|---|---|---|---|---|
| 8,465,298 | B2 * | 6/2013 | Takeuchi | H01R 13/6275 439/74 |
| 8,469,722 | B2 * | 6/2013 | Huang | H01R 12/716 439/74 |
| 8,992,234 | B2 * | 3/2015 | Yoshioka | H01R 12/7029 439/74 |
| 9,039,428 | B2 * | 5/2015 | Sasaki | H01R 13/631 439/74 |
| 9,196,982 | B2 * | 11/2015 | Sasaki | H01R 12/73 |
| 9,225,086 | B2 * | 12/2015 | Takeuchi | H01R 12/716 |
| 9,318,823 | B2 * | 4/2016 | Lee | H01R 12/7029 |
| 9,325,103 | B2 * | 4/2016 | Arai | H01R 13/5219 |
| 9,450,318 | B2 * | 9/2016 | Hasegawa | H01R 12/73 |
| 9,543,675 | B1 * | 1/2017 | Takenaga | H01R 13/635 |
| 9,705,223 | B2 * | 7/2017 | Miyazaki | H01R 12/716 |
| 9,728,882 | B1 * | 8/2017 | Nakazawa | H01R 12/73 |
| 9,825,386 | B2 * | 11/2017 | Lee | H01R 12/73 |
| 9,887,473 | B2 * | 2/2018 | Lee | H01R 12/716 |
| 10,170,849 | B2 * | 1/2019 | Tanaka | H01R 12/7058 |
| 10,312,637 | B2 * | 6/2019 | Chuang | H01R 13/6585 |
| 10,396,480 | B2 * | 8/2019 | Lee | H01R 13/6471 |
| 10,498,056 | B2 * | 12/2019 | Miyazaki | H01R 12/7029 |
| 10,566,723 | B2 * | 2/2020 | Ueda | H01R 13/24 |
| 10,651,581 | B1 * | 5/2020 | Sasayama | H01R 12/7005 |
| 10,673,159 | B2 * | 6/2020 | Ishida | H01R 12/716 |
| 10,680,362 | B2 * | 6/2020 | Yoshioka | H01R 12/73 |
| 10,784,616 | B2 * | 9/2020 | Gondo | H01R 13/41 |
| 10,819,052 | B2 * | 10/2020 | Ueda | H01R 13/50 |
| 10,910,745 | B2 * | 2/2021 | Hosoda | H01R 13/631 |
| 10,998,655 | B2 * | 5/2021 | Minai | H01R 12/71 |
| 11,075,475 | B2 * | 7/2021 | Chen | H01R 13/6585 |
| 11,095,058 | B2 * | 8/2021 | Zhang | H01R 13/516 |
| 11,095,059 | B2 * | 8/2021 | Gondo | H01R 13/627 |
| 11,133,616 | B2 * | 9/2021 | Meng | H01R 12/716 |
| 11,139,601 | B2 * | 10/2021 | Meng | H01R 13/6594 |
| 11,158,968 | B2 * | 10/2021 | Tanaka | H01R 12/716 |
| 11,411,333 | B2 * | 8/2022 | Someya | H01R 13/5219 |
| 11,424,565 | B2 * | 8/2022 | Someya | H01R 12/716 |
| 11,658,431 | B2 * | 5/2023 | Gondo | H01R 12/707 439/660 |
| 11,764,510 | B2 * | 9/2023 | Tanaka | H01R 12/716 439/74 |

FOREIGN PATENT DOCUMENTS

| | | | |
|---|---|---|---|
| CN | 109075506 | B | 5/2021 |
| CN | 110858685 | B | 7/2021 |
| JP | 2003288966 | A | 10/2003 |
| JP | 2008300193 | A | 12/2008 |
| JP | 2016081632 | A | 5/2016 |
| JP | 2017033909 | A | 2/2017 |
| JP | 2018113268 | A | 7/2018 |
| JP | 2018181820 | A | 11/2018 |
| JP | 2021093274 | A | 6/2021 |
| TW | M575202 | U | 3/2019 |
| TW | 202044675 | A | 12/2020 |
| TW | M606335 | U | 1/2021 |
| TW | 202109985 | A | 3/2021 |

* cited by examiner

Prior art

CONNECTOR

RELATED APPLICATIONS

This application claims priority to Japanese Patent Application No. 2021-128231, filed Aug. 4, 2021, which is incorporated herein by reference in its entirety.

TECHNICAL FIELD

The present disclosure relates to a connector.

BACKGROUND ART

Conventionally, board-to-board connectors have been used to electrically connect pairs of parallel circuit boards to each other. Such connectors are attached to each of opposing surfaces of the pair of circuit boards, and fitted together to secure electric conduction. Furthermore, a recess and ridge is formed in the contact portion of the terminal to give the operator a sense of clicking for completing the mating operation (for example, see Patent Document 1).

FIGS. 13A and 13B are perspective views illustrating a conventional terminal. Note, in the drawing, FIGS. 13A and 13B are views from mutually different viewing angles.

In the drawing, 961 is a terminal attached by press fitting into the housing of a plug connector which is a connector mounted on the surface of a circuit board (not shown), and is used as a signal terminal for connecting a signal line, for example. The terminal 961 is a metal member attached so as to straddle a side wall formed in the housing, and has a side surface shape substantially like a ladle. The portion corresponding to the handle of the ladle is the board connecting portion 962 soldered to the surface of the circuit board. In addition, the portion corresponding to the main body of the ladle includes a first contact portion 965 and second contact portion 966 extending in the vertical direction and a connecting portion 964 extending in the width direction and has a U-shaped side surface shape.

The first contact portion 965 is a portion that functions as a contact point that comes into contact with a mating terminal (not shown), and a tip portion 967 is formed with engaging tabs 967*a* protruding on both sides. In addition, the second contact portion 966 is the portion that exhibits the click sensation and a protrusion 966*b* that engages with a protruding portion of the counterpart terminal (not shown) is formed on the surface thereof. Furthermore, the second contact portion 966 has engaging tabs 966*a* formed protruding from both sides.

Furthermore, the terminal 961 is pressed into the housing (not shown) from above the housing so that the portion corresponding to the main body of the ladle straddles the side wall, and the first contact portion 965 and the second contact portion 966 are inserted into terminal retention grooves formed on both surfaces of the side wall. Herein, the engaging tabs 966*a* of the second contact portion 966 penetrate into and engage with the side surface of the terminal retention grooves formed on the outer surfaces of the side wall. In addition, the tip portion 967 is pushed into the lower end of the terminal retention groove formed on the inner side surface of the side wall, and the engaging tabs 967*a* penetrate into and engage with the side surface of the lower end of the terminal holding groove. Thus, the terminal 961 is reliably mounted to the housing.

PRIOR ART DOCUMENTS

Patent Documents

Patent Document 1: Japanese Unexamined Patent Application 2008-300193

SUMMARY

However, with the conventional connector, when a strong pulling force is applied by the operator to release the mating state with the counterpart connector, a strong force is applied to the terminal 961 from the counterpart terminal in the disengagement direction causing the first contact portion 965 to be lifted and the tip portion 967 to roll up and this may lead to damage such as deformation. If the terminal 961 is deformed or damaged in this manner, the connector and the counterpart connector cannot be mated back together for use. That is, the connector cannot be reused.

In particular, in recent years, the size and height of the connector has been reduced, and the terminal 961 has also become miniaturized. Therefore, improving the strength of the terminal 961 to prevent rolling up, deformation, and damage is extremely difficult.

The purpose herein is to solve the conventional problems and provide a connector that is small and low profile, where the terminal will not roll up even if a strong pulling force is applied, where repeated mating and release can be performed, that has a simple structure, is low cost, and has high reliability.

Therefore, a connector is provided with a housing including an insulating material and a terminal integrated with the housing and including a conductive material, where the housing includes a protrusion extending in the longitudinal direction of the connector; the terminal includes a plate portion that extends in the vertical direction, the surface thereof exposed to one side surface of the protrusion, an opposing plate portion that extends in the vertical direction, the surface thereof exposed to another side surface of the protrusion, a coupling portion that couples the upper end of the plate portion and the upper end of the opposing plate portion, and a securing portion connected to the lower end of the plate portion; and a stepped portion is formed at the boundary of the surface of the plate portion and the surface of the coupling portion and the surface of the securing portion is covered by the insulating material.

In another connector, the securing portion is thinner than the plate portion.

In still another connector, another stepped portion is formed at the boundary between the surface of the plate portion and the surface of the securing portion, and the back surface of the plate portion and the back surface of the securing portion are both formed on the same plane.

In still another connector, the securing portion further includes a long portion that is longer than the plate portion.

In still another connector, at least a portion of the [wide] long portion gradually increases in length going downwards.

In still another connector, the terminal includes a board connecting portion extending outward in the width direction of the connector from the lower end of the opposing plate portion, the surface of the opposing plate portion is exposed to the side surface of the protrusion facing outward in the width direction of the connector, and the surface of the plate portion is exposed to the side surface of the protrusion facing inward in the width direction of the connector.

In still another connector, the terminal includes a board connecting portion extending outward in the width direction of the connector from the lower end of the opposing plate portion, the surface of the opposing plate portion is exposed to the side surface of the protrusion facing inward in the width direction of the connector, and the surface of the plate portion is exposed to the side surface of the protrusion facing outward in the width direction of the connector.

A connector pair includes the connector described above and a mating connector that mates with the connector.

According to the present disclosure, although the connector is small and low profile, the terminal does not roll up even when a strong pulling force is applied, and the connector can be repeatedly mated and released. In addition, the structure can be simplified, the cost can be reduced, and the reliability is improved.

BRIEF DESCRIPTION OF DRAWINGS

FIG. 4A is a plan view, FIG. 4B is a cross-sectional view taken along the line A-A in FIG. 4A, FIG. 4C is a side view, and FIG. 4D is a sectional view taken along the line B-B in FIG. 4A.

FIG. 5A is a perspective view, FIG. 5B is a front view, and FIG. 5C is a side view.

FIG. 7A is a plan view, FIG. 7B is a side view, and FIG. 7C is a cross-sectional view taken along the line C-C in FIG. 7A.

FIG. 8A is a plan view, FIG. 8B is a side view, and FIG. 8C is a cross-sectional view taken along the line D-D in FIG. 8A.

FIG. 10A is a perspective view, FIG. 10B is a front view, and FIG. 10C is a side view.

FIG. 11A is a perspective view, FIG. 11B is a front view, and FIG. 11C is a side view.

FIG. 12A is a back surface view, and FIG. 12B is a perspective view as viewed from a different angle.

FIGS. 13A and 13B are diagrams as viewed from mutually different angles.

DETAILED DESCRIPTION OF THE INVENTION PREFERRED EMBODIMENTS

Embodiments will hereinafter be described in detail with reference to the drawings.

Figure 1:
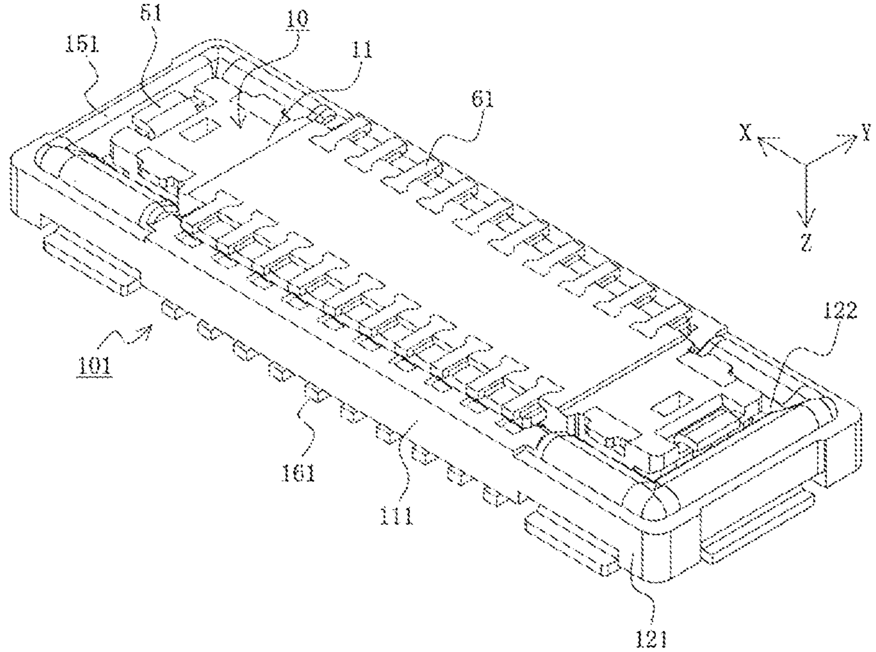
FIG. 1 is a perspective view illustrating the first connector and the second connector of Embodiment 1 in a mated state.
Figure 2:
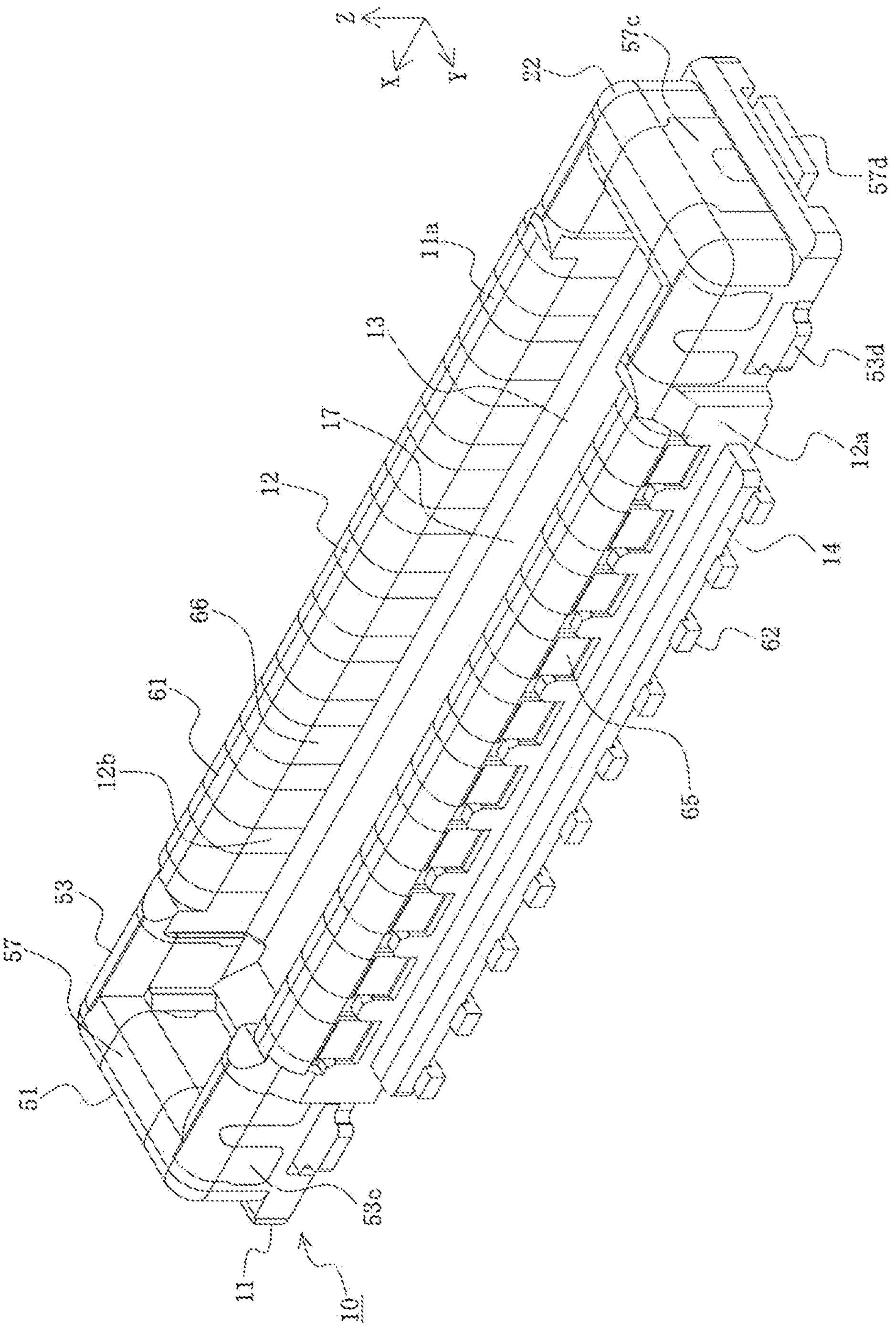
FIG. 2 is a perspective view of the first connector according to Embodiment 1.
Figure 3:
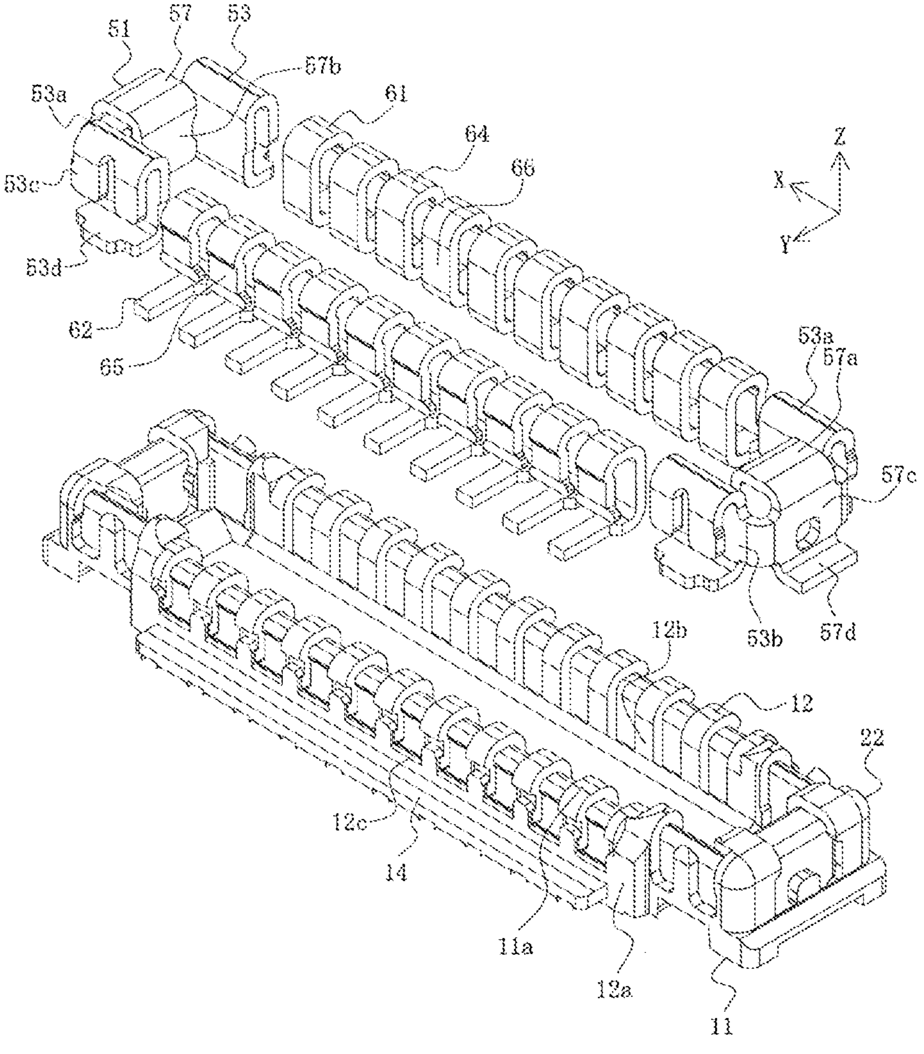
FIG. 3 is an exploded view of the first connector according to Embodiment 1.
Figures 4A, 4B, 4C, 4D:
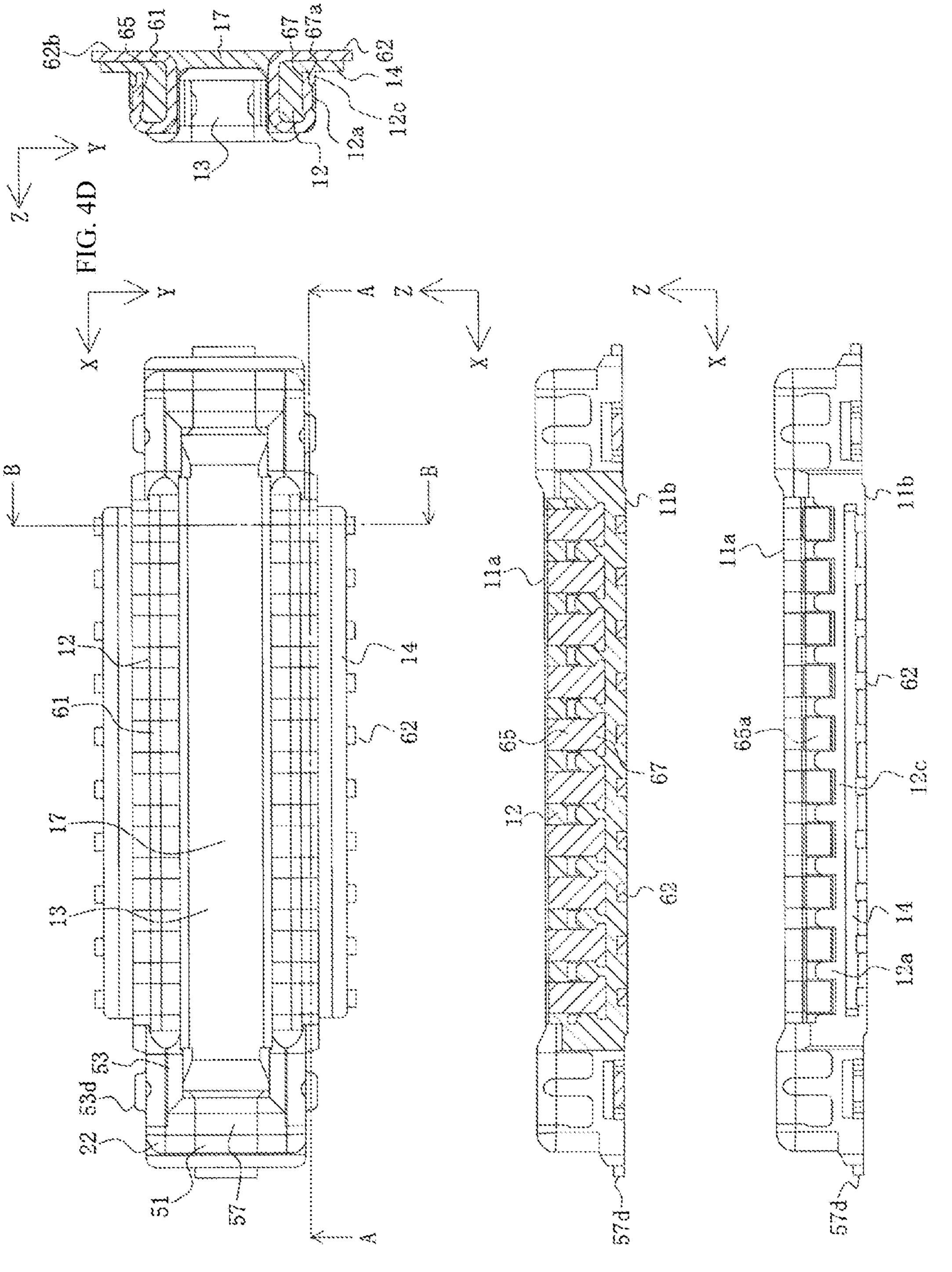
FIGS. 4A-4D are a four-view diagram of the first connector according to Embodiment 1, where
Figure 5A:
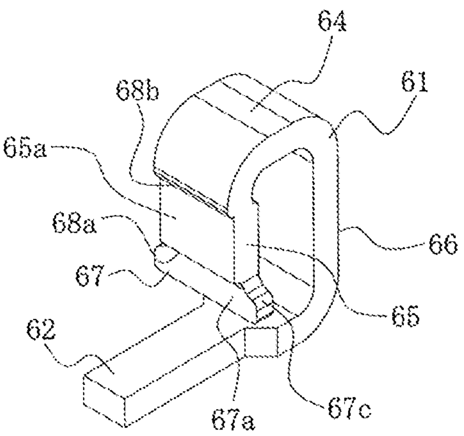
FIGS. 5A-5C are a three-view diagram of the first terminal in Embodiment 1, where
Figure 5B:
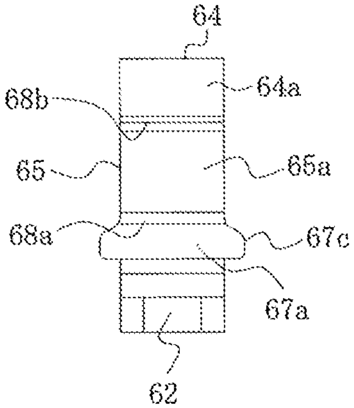
Figure 5C:
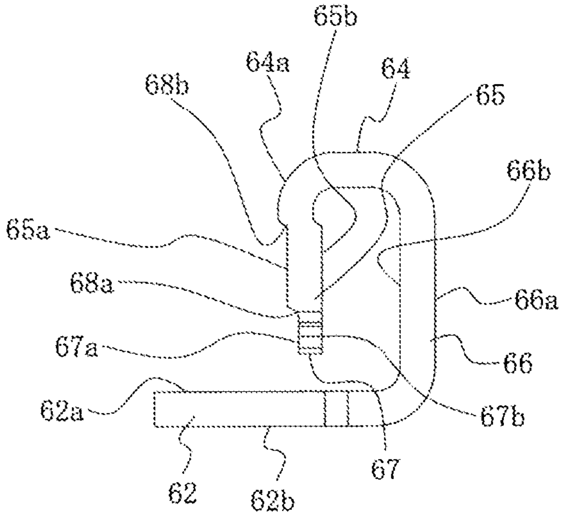

FIG. 1 is a perspective view illustrating a mated state of the first connector and the second connector according to Embodiment 1. FIG. 2 is a perspective view of the first connector according to Embodiment 1. FIG. 3 is an exploded view of the first connector according to Embodiment 1. FIGS. 4A-4D are a four-view diagram of the first connector according to Embodiment 1. FIGS. 5A-5C are a three-view diagram of the first terminal of Embodiment 1. Note, FIG. 4A is a plan view, FIG. 4B is a cross-sectional view taken along the line A-A in FIG. 4A, FIG. 4C is a side view, FIG. 4D is a sectional view taken along the line B-B in FIG. 4A. FIG. 5A is a perspective view, FIG. 5B is a front view, and FIG. 5C is a side view.

In the drawings, 10 is a connector of the present Embodiment and is a first connector as one of a pair of board to board connectors that are a connector pair. The first connector 10 is a surface mount type connector mounted on a surface of a first board (not shown) that is a substrate as a mounting member and mates with a second connector 101 that is a counterpart connector of the connector pair. In addition, the second connector 101 is the other of the pair of board to board connectors, is a surface mount type connector mounted on a surface of a second board that is the substrate (not shown) as a mounting member, and is mated to the first connector 10 that is a counterpart connector of the connector pair.

In addition, the first connector 10 and the second connector 101 of the present Embodiment are preferably used to electrically connect the first board and the second board as boards, and can also be used to electrically connect other members. For example, the first substrate and the second substrate are each a printed circuit board, a flexible flat cable (FFC), a flexible circuit board (FPC), or the like as used in electronic devices or the like, but may be any type of substrate.

Note that in the present embodiment, expressions indicating direction such as top, bottom, left, right, front, rear, and the like used to describe a configuration and operation of each part of the first connector 10 and the second connector 101 are relative rather than absolute, and are proper when each part of the first connector 10 and the second connector 101 are in positions illustrated in the drawings, but should be changed and interpreted according to a change in position with a change in posture.

The first connector 10 is what is called a plug connector type, and includes a first housing 11 as a housing that is a connector body integrally formed using an insulating material such as a synthetic resin. As illustrated in the drawings, the first housing 11 has a substantially rectangular thick plate-like shape that is a substantially rectangular parallelepiped. An elongated recessed groove portion 13 extending in a longitudinal direction (X-axis direction) of the first housing 11 and a first protrusion 12 as an elongated protrusion defining an outside of the recessed groove portion 13 and extending in the longitudinal direction of the first housing 11 are integrally formed on the side fitted in the second connector 101 of the first housing 11, namely, on the side of a mating surface 11*a* (the side in a positive Z-axis direction). The first protrusion 12 is formed along both sides of the recessed groove portion 13 and along both sides of the first housing 11. For example, the first connector 10 has dimensions of a length of approximately 5.2 mm, a width of approximately 1.9 mm, and a thickness of approximately 0.6 mm. However, the dimensions can be changed as appropriate.

The first terminal 61 as a terminal is attached to each of the first protrusions 12. A plurality (for example ten pieces) of first terminals 61 are mounted at a prescribed pitch (for example, approximately 0.35 (mm)). Each come into contact with second terminals 161 provided in the second connector 101. The pitch and the number of the first terminals 61 can be appropriately changed. In the recessed groove portion 13, the side mounted on the first board, in other words, the mounting surface 11*b* side (the side in a negative Z-axis direction) is closed by a bottom plate 17.

A first protrusion end portion 22 as a fitting guide is disposed on each of both sides in the longitudinal direction of the first housing 11. The first protrusion end portion 22 is a thick member extending in a width direction (Y-axis direction) of the first housing 11, both ends of the first protrusion end portion 22 are connected to both ends in the longitudinal direction of the first protrusion 12, and an upper surface of the first protrusion end portion 22 has a substantially rectangular shape. In a state in which the first connector 10 and the second connector 101 are mated together, the first protrusion end portion 22 functions as an insertion protrusion inserted into a mating recessed portion 122 of a second protrusion end portion 121 included in the second connector 101. A first reinforcing metal fitting 51 that is a reinforcing metal fitting is attached to the first protrusion end portion 22. The first reinforcing metal fitting 51 comes into contact with and conducts with a second reinforcing metal fitting 151 included in the second connector 101.

In the present embodiment, the first terminal 61 and the first reinforcing metal fitting 51 will be described as being integrated with the first housing 11 by overmold molding (insert molding). In other words, the first housing 11 is molded by filling the cavity of a mold, in which the first terminals 61 and first reinforcing metal fitting 51 have been set beforehand, with an insulating material such as synthetic resin. As a result, at least a portion of the first terminals 61 and the first reinforcing metal fitting 51 are embedded in the first housing 11 so as to be integrally mounted to the first housing 11. Thus, it should be noted that although the first terminal 61 and the first reinforcing metal fitting 51 are not mutually separate from the first housing 11, for convenience of description, in FIG. 3, the two are illustrated as mutually separate.

The first terminal 61 is a member integrally formed by carrying out processing such as punching and bending of a conductive metal plate and includes:

- a plate portion 65 that functions as an external connecting portion and extends in the vertical direction;
- an opposing plate portion 66, that is opposite the plate portion 65, that functions as an inner contact portion, and extends in the vertical direction of the first housing 11; a coupling portion 64 having both bent ends thereof connected to the upper ends of the plate portion 65 and the opposing plate portion 66; and
- a board connecting portion 62 that extends in the width direction of the first housing 11 where a first bent end thereof is connected to the lower end of the opposing plate portion 66. In addition, a securing portion 67 is connected to the tip (lower end) of the plate portion 65.

The securing portion 67 is formed so as to be thinner than the plate portion 65. As a result, as illustrated in FIGS. 5A-5C, a first stepped portion 68*a* as a step portion is formed at the boundary between a surface 65*a* of the plate portion 65 and a surface 67*a* of the securing portion 67. Note that the surface 65*a* of the plate portion 65 and the surface 67*a* of the securing portion 67 are both flat surfaces extending in the vertical direction. In addition, a back surface 65*b* of the plate portion 65 and a back surface 67*b* of the securing portion 67 are also flat surfaces extending in the vertical direction, and since there is no step portion between them, they are both formed on the same plane. Furthermore, a second stepped portion 68*b* as a step portion is formed at the boundary between the surface 65*a* of the plate portion 65 and a surface 64*a* of the coupling portion 64. Note that a surface 66*a* and a back surface 66*b* of the opposing plate portion 66 are flat surfaces that extend in the vertical direction.

In addition, the dimensions of the plate portion 65, the opposing plate portion 66, and the coupling portion 64 in the length direction (X-axis direction) are formed to be the same, but the board connecting portion 62 is formed such that the dimension in the length direction for most of the board connecting portion 62 thereof is narrowed. The securing portion 67 includes a long portion 67*c* having a larger dimension in the length direction than the plate portion 65. The long portion 67*c* is desirably formed with both edges in the length direction outside of both edges of the plate portion 65 and with at least a portion thereof having a gradually increasing dimension in the length direction going downwards.

The elongated strip member constituting the first terminal 61 extends from the tip of the board connecting portion 62 (outer end of the first housing 11 in the width direction) positioned outside an outer surface 12*a* that is one side surface of a first protrusion 12 to an inner surface 12*b* that is another side surface of the first protrusion 12, in other words to the inner surface 12*b* facing the inside of the first housing 11 in the width direction, is bent at approximately 90 degrees, extends from the bottom end to the top end of the opposing plate portion 66, is bent approximately 90 degrees at this upper end, becomes the coupling portion 64, extends towards the outside of the first housing 11 in the width direction, is bent approximately 90 degrees, and extends from the top to the bottom of the plate portion 65. In other words, the first terminal 61, as viewed from the longitudinal direction of the first housing 11, has a winding shape that proceeds inwards from the outside in the width direction of the first housing 11 and then winds around and a winding shape that winds upward and then winds backward.

As illustrated in FIGS. 4A-4D, in a state of being integrated with the first housing 11, the first terminal 61 is substantially entirely embedded in the first protrusion 12, and the surface 65*a* of the plate portion 65, the surface 64*a* of the coupling portion 64, and the surface 66*a* of the opposing plate portion 66 are exposed to the outer surface 12*a* and the inner surface 12*b* of the first protrusion 12 as well as to the mating surface 11*a*. In addition, although a back surface 62*b* of the board connecting portion 62 is exposed on the mounting surface 11*b*, most of a front surface 62*a* thereof is covered by a side portion flange 14 that extends from the lower end of the outer surface 12*a* of the first protrusion 12 to the outside of the first housing 11 in the width direction. That is, when viewed from above, the board connecting portion 62 has a tip that slightly protrudes from the side portion flange 14 to the outside of the first housing 11 in the width direction. Therefore, the first terminal 61 is firmly integrated with the first housing 11. The back surface 62*b* of the board connecting portion 62 abuts the surface of the first board (not shown) and is connected to a connection pad coupled to a signal line by soldering or the like.

Furthermore, the surface 67*a* of the securing portion 67 is in an indented state on the inside in the width direction of the first housing 11 (or to the inside of the first protrusion 12) relative to the surface 65*a* of the plate portion 65 connected via the first stepped portion 68*a* and substantially parallel to the surface 65*a* of the plate portion 65 and is therefore covered by a cover portion 12*c* formed with nearly a uniform thickness near the lower end of the outer surface 12*a* of the first protrusion 12 and adjacent to the side portion flange 14. Note, the outer surface of this cover portion 12*c* is formed so as to be at the same level as a portion of the first protrusion 12 other than the outer surface 12*a*. Therefore, even if a force for lifting the plate portion 65 upward is applied from the second terminal 161 that is in contact with the first terminal 61 in a state where the first connector 10 and the second connector 101 are mated, there is no way for the securing portion 67 connected to the tip of the plate portion 65 to roll up. Moreover, the securing portion 67 includes a long portion 67*c* and the long portion 67*c* with dimensions larger than the plate portion 65 in the length direction is covered by the cover portion 12*c*; therefore, rolling up of the securing portion 67 is more reliably prevented.

The first reinforcing metal fitting 51 is a member integrally formed by performing processing such as punching or bending on a metal plate, and includes an end wall cover portion 57 as a main body covering the outside of the first protrusion end portion 22 and a side cover portion 53 connected to both the left and right ends of the end wall cover portion 57.

The end wall cover portion 57 includes:

- an end wall upper cover portion 57*a* that extends generally in the width direction of the first housing 11 and covers at least the center portion of the upper surface of the first protrusion end portion 22;
- an end wall inner cover portion 57*b* that extends from this end wall upper cover portion 57*a* at the inner edge of the first housing 11 in the longitudinal direction downward; an end wall outer cover portion 57*c* that extends from the end wall upper cover portion 57*a* at the outer edge of the first housing 11 in the longitudinal direction downward; and
- an end wall board connecting portion 57*d* that is bent from and connected to the end wall outer cover portion 57*c* and extends outward from the first housing 11 in the longitudinal direction.

In addition, the side cover portion 53 includes:

- connecting arm portions 53*b* that are connected to both ends of the end wall outer cover portion 57*c* in the width direction (Y axis direction) and are bent so as to extend toward the inside of the first housing 11 in the longitudinal direction;
- a side wall upper cover portion 53*a* connected to the upper end of the connecting arm portions 53*b*;
- a side wall outer cover portion 53*c* that extends from the side wall upper cover portion 53*a* at the outer edge of the first housing 11 in the width direction downward; and
- a side wall board connecting portion 53*d* bent and connected to the lower end of the connecting arm portion 53*b* and extending to the outside of the first housing 11 in the width direction.

In an integrated state with the first housing 11, the first reinforcing metal fitting 51 is nearly completely embedded in the first protrusion end portion 22 and only the surfaces of the end wall cover portion 57 and the side cover portion 53 are exposed. In addition, the back surfaces of the end wall board connecting portion 57*d* and the side wall board connecting portion 53*d* are exposed on the mounting surface 11*b*. As viewed from above, the tips of the end wall board connecting portion 57*d* and the side wall board connecting portion 53*d* protrude slightly from the first protrusion end portion 22 to the outside in the longitudinal direction and in the width direction of the first housing 11. Furthermore, the back surfaces of the end wall board connecting portion 57*d* and the side wall board connecting portion 53*d* desirably abut with the surface of the first board and are desirably connected to a connection pad coupled to a power line or ground line by soldering or the like.

Next, the configuration of the second connector 101 will be described.

Figure 6:
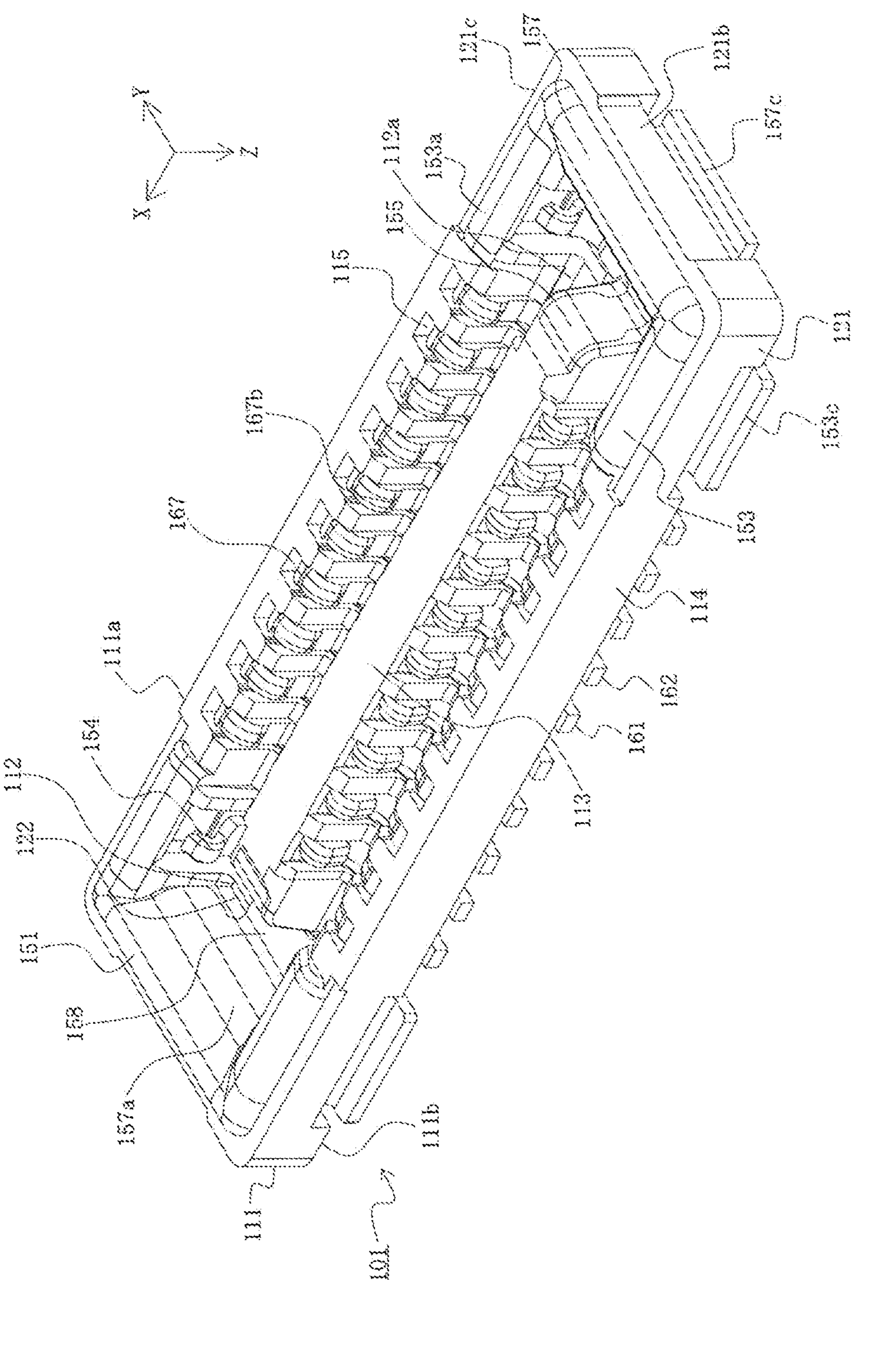
FIG. 6 is a perspective view of the second connector according to Embodiment 1.
Figures 7A, 7B, 7C:
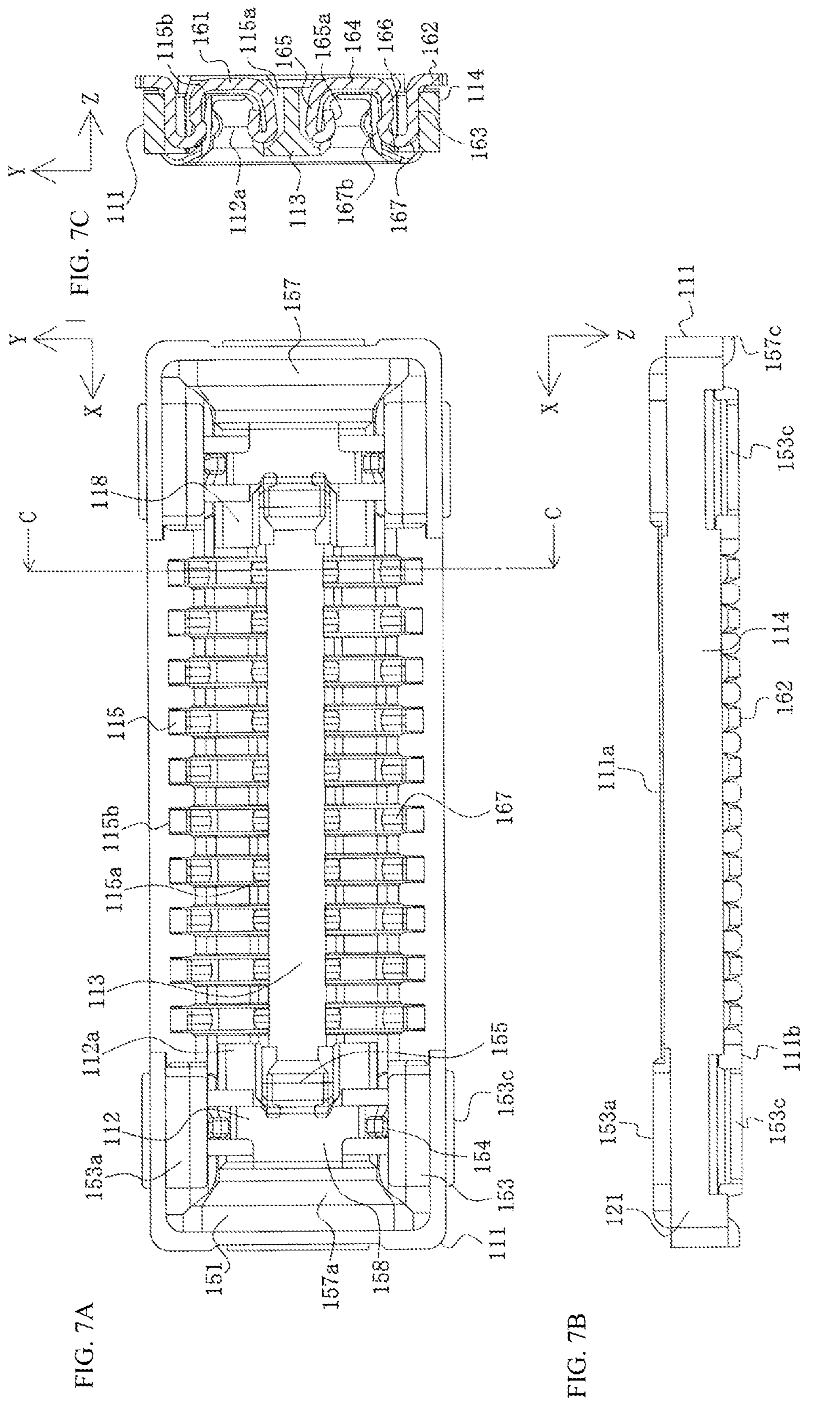
FIGS. 7A-7C are a three-view diagram of the second connector according to Embodiment 1, where

FIG. 6 is a perspective view of the second connector according to Embodiment 1. FIGS. 7A-7C are a three-view diagram of the second connector according to Embodiment 1. FIG. 7A is a plan view, FIG. 7B is a side view, and FIG. 7C is a cross-sectional view taken along the line C-C of FIG. 7A.

In the present embodiment, the second connector 101 is a so-called receptacle connector type that is a connector body that is a counterpart integrally formed of an insulating material such as a synthetic resin and includes a second housing 111 as a housing. As illustrated in the drawings, the second housing 111 has a substantially rectangular thick plate-like shape that is a substantially rectangular parallelepiped and has a substantially rectangular shape recess portion 112 for mating with the first housing 11 of the first connector 10 with an encircling periphery formed on the side that engages with the first connector 10, in other words, the mating surface 111*a* side (Z-axis negative direction). For example, the second connector 101 has dimensions of a length (a size in the X-axis direction) of about 6.0 mm, a width (a size in the Y-axis direction) of about 2.0 mm, and a thickness (a size in the Z-axis direction) of about 0.6 mm. However, the dimensions can be changed as appropriate.

Furthermore, a second protrusion 113 as an islet for mating with the recessed groove portion 13 of the first connector 10 is integrally formed with the second housing 111 in the recess portion 112. In addition, sidewalls 114 that extend parallel to the second protrusion 113 are integrally formed with the second housing 111 on both sides of the second protrusion 113 (positive and negative direction of Y-axis). The second protrusion 113 and the sidewalls 114 protrude upward (negative Z-axis direction) from a bottom plate 118 defining a bottom surface of the recess portion 112, and extend in the longitudinal direction (X-axis direction) of the second housing 111. Consequently, a recessed groove portion 112*a* that is an elongated recessed portion extending in the longitudinal direction of the second housing 111 is formed as a part of the recess portion 112 on both the sides of the second protrusion 113.

A second terminal stowing internal cavity 115*a* having a recessed groove shape is formed on the side surfaces on both the sides of the second protrusion 113. A second terminal stowing outer cavity 115*b* having a recessed groove shape is formed in a side surface on the inside of the sidewalls 114. The second terminal stowing inner cavity 115*a* and the second terminal stowing outer cavity 115*b* are coupled together and are integrated with each other at the bottom surface of the recessed groove portion 112*a*, so that the second terminal stowing inner cavity 115*a* and the second terminal stowing outer cavity 115*b* are described as a second terminal stowing cavity 115 when collectively described. The second terminal stowing cavity 115 is formed so as to pierce the bottom plate 118 in the plate-thickness direction (Z-axis direction).

In the present Embodiment, the second terminal stowing cavity 115 is formed on both the sides in the width direction (Y-axis direction) of the second housing 111 while arranged in the longitudinal direction of the second housing 111. Specifically, a plurality (for example, 10) of second terminal stowing cavities 115 are formed on both the sides of the second protrusion 113 at a predetermined pitch (for example, about 0.35 mm). The pitch and the number of the second terminal stowing cavity 115 can be changed as appropriate. A plurality of second terminals 161 each stowed in the second terminal stowing cavities 115 as a counterpart terminal mounted in the second housing 111 are also arranged on both sides of the second protrusion 113 with a similar pitch.

The second terminal 161 is a member integrally formed by performing processing such as punching and bending on a conductive metal plate, and includes a retained portion 163, a board connecting portion 162 connected to the lower end of this retained portion 163, an upper coupling portion 167 connected to the upper end of the retained portion 163, an outer contact portion 166 that is connected to the lower end of the upper coupling portion 167 and faces the retained portion 163, a lower connecting portion 164 connected to the lower end of the outer contact portion 166, and an inner coupling portion 165 connected to an end of the lower connecting portion 164 on the side opposite the outer contact portion 166.

The retained portion 163 is a portion that is fitted in and held by the second terminal stowing outer cavity 115*b* while extending in a fitting direction (Z-axis direction), namely, in the thickness direction of the second housing 111. In addition, the board connecting portion 162 is bent relative to and connected to the retained portion 163, extends in the left-right direction (Y-axis direction), in other words, the width direction of the second housing 111, the back surface thereof abuts the surface of a second board (not shown), and is connected to a connection pad coupled to a signal line by soldering or the like. The upper coupling portion 167 is a portion that is curved so as to protrude upward (negative Z-axis direction).

The outer contact portion 166 is connected to the lower end of the upper coupling portion 167 on the side opposite the retained portion 163 and extends downward (Z-axis positive direction). The upper coupling portion 167 includes a protrusion portion 167*b* protruding inward at the lower end thereof in the width direction of the second housing 111. The lower connecting portion 164 is a portion including a substantially U-shaped side surface shape connected to the lower end of the outer contact portion 166. Furthermore, an inner contact portion 165*a* curved by roughly 180 degrees is connected to an upper end of the inner coupling portion 165 so as to protrude upward and toward the outer contact portion 166.

The second terminal 161 is fitted in the second terminal stowing cavity 115 from the side of the mounting surface 111*b* that is a lower surface (a surface in the positive Z-axis direction) of the second housing 111, and the retained portion 163 is sandwiched from both sides by the sidewalls of the second terminal stowing outer cavity 115*b* formed on the side surface on the inside of the sidewalls 114, whereby the second terminal 161 is fixed to the second housing 111. Here, in other words, in a state in which the second terminal 161 is installed in the second housing 111, the inner contact portion 165*a* and the outer contact portion 166 are positioned on the right and left sides of the recessed groove portion 112*a* and face each other. The second terminal 161 is a member integrally formed by processing a metal plate, and thus has a certain degree of elasticity. As is clear from the shape, the space between the mutually opposed inner contact portion 165*a* and the outer contact portion 166 is able to change in an elastic manner. In other words, when the first terminal 61 included in the first connector 10 is inserted between the inner contact portion 165*a* and the outer contact portion 166, the space between the inner contact portion 165*a* and the outer contact portion 166 lengthens and shortens in an elastic manner.

The second terminal 161 may be integrated with the second housing 111 by over-molding (insert molding).

In addition, second protrusion end portions 121 are disposed as mating guide parts on both ends in the longitudinal direction of the second housing 111. The mating recessed portions 122 are formed as part of the recess portion 112 in each second protrusion end portion 121. The mating recessed portion 122 is a substantially rectangular recess portion and is connected to both ends in the longitudinal direction of each recessed groove portion 112*a*. Furthermore, in the state in which the first connector 10 and the second connector 101 are mated together, the first protrusion end portion 22 included in the first connector 10 is inserted into the mating recessed portion 122.

The second protrusion end portion 121 includes a side wall extension 121*c* as a sidewall of the second protrusion end portion 121 extending in the longitudinal direction of the second housing 111 from both the ends in the longitudinal direction of the sidewalls 114 and an end wall portion 121*b* extending in the width direction of the second housing 111, both ends of the end wall portion 121*b* being connected to the side wall extension 121*c*. In each second protrusion end portion 121, the end wall portion 121*b* and the side wall extension 121*c* connected to both the ends of the end wall portion 121*b* form a continuous and substantially U-shaped sidewall and define three sides of the substantially rectangular mating recessed portion 122.

A second reinforcing metal fitting 151 as a reinforcing metal fitting attached to the second housing 111 is attached to the second protrusion end portion 121. The second reinforcing metal fitting 151 is a member integrally formed by performing processing such as punching or bending on the metal plate, and includes an end wall cover portion 157 covering at least a portion of the end wall portion 121*b* of the second protrusion end portion 121, a connecting arm portion 153 connected to the left and right ends of the end wall cover portion 157, a bottom surface cover portion 158 connected to the end wall cover portion 157 and covering the bottom surface of the mating recessed portion 122, an island end cover portion 155 connected to the bottom surface cover portion 158, and a pair of right and left contact arm portions 154.

The second reinforcing metal fitting 151 may be pressed into and held by the second housing 111. However, in this case, the second reinforcing metal fitting 151 and the second housing 111 will be described as a member integrated with another by over-molding (insert molding).

The end wall cover portion 157 includes an end wall upper cover 157*a* that in general extends in the width direction of the second housing 111 and covers at least a portion of the upper surface of the end wall portion 121*b* and a board connecting portion 157*c* that is bent and connected to the lower end of the portion of the end wall upper cover portion 157*a* extending from the outer end edge downwards and extends in the front-to-back direction (X axis direction), in other words, towards the outside of the second housing 111 in the longitudinal direction.

The end wall upper cover portion 157*a* is an incline portion extending diagonally downward from the upper end of the end wall portion 121*b* toward the mating recessed portion 122, and is stowed in a portion near the upper end in the mating recessed portion 122. Thus, the vicinity of the upper end of the inner surface on the end side in the longitudinal direction of the second housing 111 in the mating recessed portion 122 is an inclined surface covered with the end wall upper cover portion 157*a*. In addition, the back surface of the board connecting portion 157*c* preferably abuts the surface of the second board and is connected to a connection pad coupled to a power line or ground line by soldering or the like.

The connecting arm portion 153 is a member that is bent and connected to each of both the ends in the width direction (Y-axis direction) of the end wall cover portion 157, the member extending toward the center in the longitudinal direction of the second housing 111. The side wall upper cover portion 153*a* is connected to the upper end of each of the connecting arm portions 153, and a board connecting portion 153*c* that extends outward in the width direction of the second housing 111 is connected to the lower end of each of the connecting arm portions 153.

The side wall upper cover portion 153*a* is configured to cover the vicinity of the upper end of the side wall extension 121*c*. In addition, the back surface of the board connecting portion 153*c* preferably abuts the surface of the second board and is connected to a connection pad coupled to a power line or ground line by soldering or the like.

When the second reinforcing metal fitting 151 is integrated with the second housing 111, the island end cover portion 155 covers at least a portion of the end portion of the second protrusion 113. Therefore, the end portion of the second protrusion 113 is covered with the integrated island end cover portion 155, and thus is reliably protected. The end wall cover portion 157 is integrated with the end wall portion 121*b*, and the island end cover portion 155 is integrated with the second protrusion 113 at both ends in the longitudinal direction of the second reinforcing metal fitting 151, so that the strength of the second reinforcing metal fitting 151 is improved.

Each of the pair of right and left contact arm portions 154 is an elongated plate member with a base end that is connected to the side edge of the bottom surface of the bottom surface cover portion 158, and is an elastic piece that is curved so as to have a substantially S-shape as seen from the front-back direction. The contact arm portion 154 is curved so as to protrude outward in the width direction of the second housing 111, and the vicinity of the tip of the contact arm 154 functions as a spring that is elastically displaceable in the width direction of the second housing 111. In the vicinity of the tip of the contact arm portion 154, the portion that is curved so as to protrude toward the center in the width direction of the second housing 111 contacts the first reinforcing metal fitting 51 of the first connector 10 in an elastic manner when the first connector 10 and the second connector 101 are mated together and the first protrusion end portion 22 is inserted into the mating recessed portion 122.

Next, the operation of mating the first connector 10 and the second connector 101 with the above configuration is described.

Figure 8C:
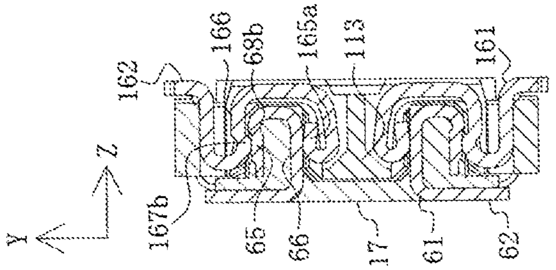
FIGS. 8A-8C are a three-view diagram of the first connector and second connector of Embodiment 1 in a mated state, where
Figure 8A:
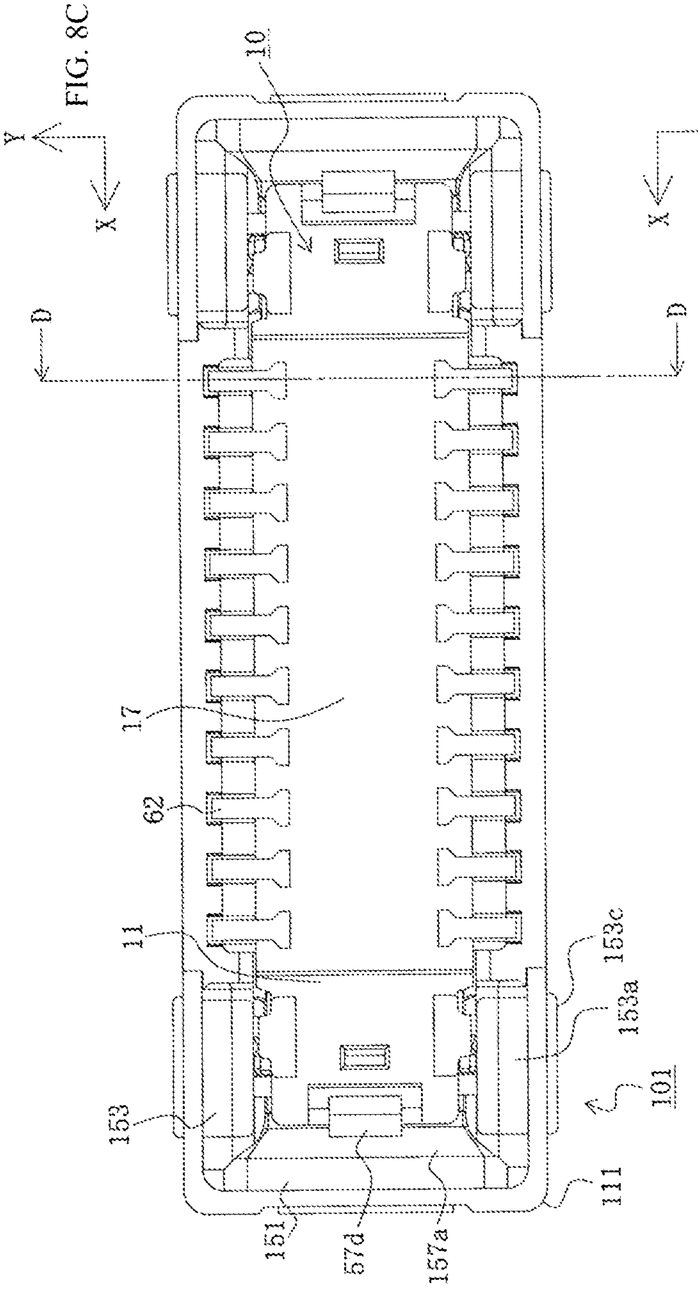
Figure 8B:
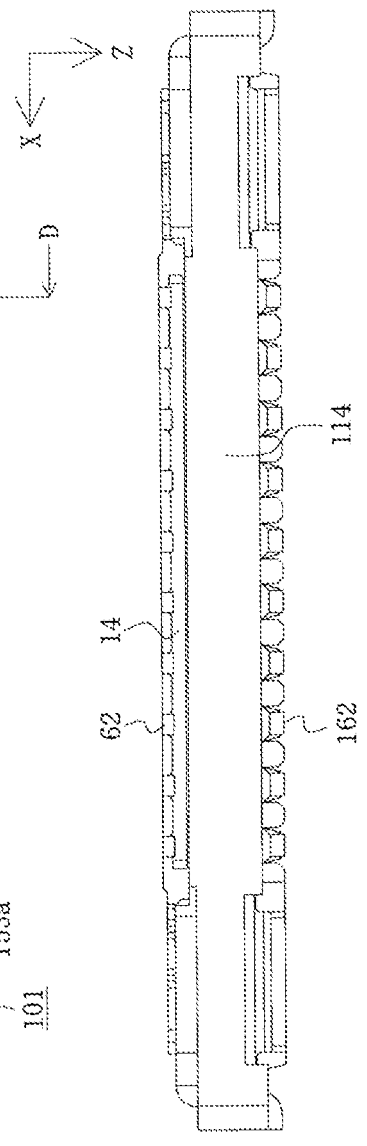
Figure 9:
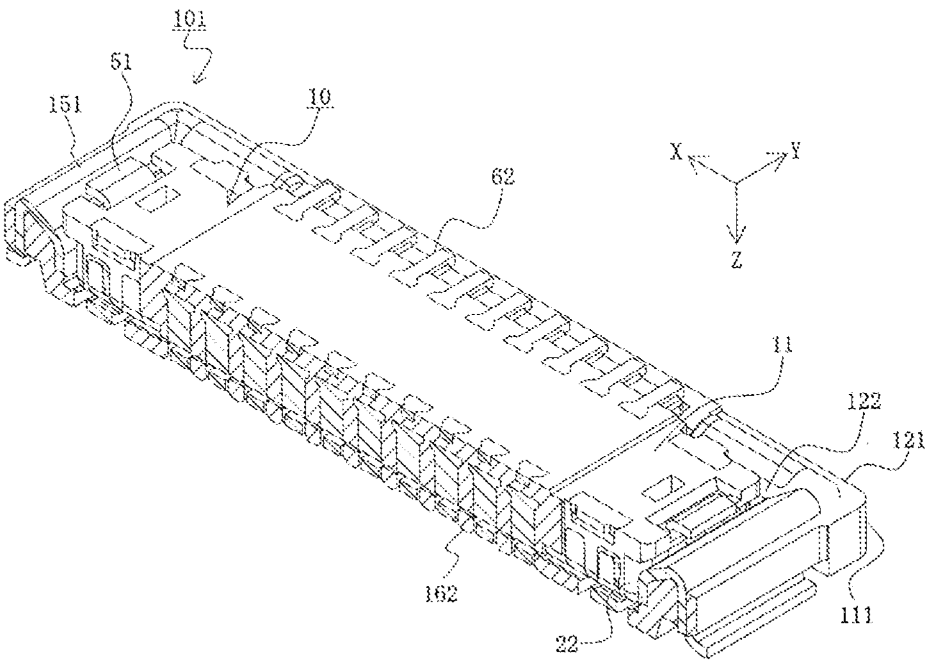
FIG. 9 is a cross-sectional view of the first connector and the second connector of Embodiment 1 in a mated state and is a cross-sectional view corresponding to a cross section taken along the line A-A of FIG. 4A.

FIGS. 8A-8C are a three-view diagram illustrating a mated state of the first connector and the second connector according to Embodiment 1. FIG. 9 is a cross-sectional view of the first connector and the second connector of Embodiment 1 in a mated state and is a cross-sectional view corresponding to a cross section taken along the line A-A of FIG. 4A. FIG. 8A is a plan view, FIG. 8B is a side view, and FIG. 8C is a cross-sectional view taken along the line D-D of FIG. 8A.

Here, the first terminal 61 of the board connecting portion 62 of the first connector 10 is connected to a connection pad coupled to a conductive trace on the first board (not shown). The side wall board connecting portion 53*d* and end wall board connecting portion 57*d* of the first reinforcing metal fitting 51 are surface mounted to the first board by being connected to a connection pad coupled to a conductive trace on the first board by soldering or the like. The conductive trace coupled to a connection pad that the board connecting portion 62 of the first terminal 61 is connected to is assumed to be a signal line. The conductive trace connected to a connection pad that the side wall board connecting portion 53*d* and the end wall board connecting portion 57*d* of the first reinforcing metal fitting 51 are connected to is assumed to be a power line or a ground line.

Similarly, the second terminal 161 board connecting portion 162 of the second connector 101 is connected to a connection pad coupled to a conductive trace on the second board (not shown). The board connecting portion 153*c* of the second reinforcing metal fitting 151 connecting arm portion 153 and the board connecting portion 157*c* of the end wall cover portion 157 are connected to a connection pad of the second board and are thus surface mounted to the second board. Note that the conductive trace coupled to a connection pad that the board connecting portion 162 of the second terminal 161 is connected to is assumed to be a signal line. Also, the conductive trace coupled to the connection pad to which the board connecting portion 153*c* of the connecting arm portion 153 of the second reinforcing metal fitting 151 and the board connecting portion 157*c* of the end wall cover portion 157 are connected is assumed to be a power line or a ground line.

First, the operator brings the mating surface 11*a* of the first connector 10 first housing 11 and the mating surface 111*a* of the second connector 101 second housing 111 opposite each other. Then, the position of the first protrusion 12 of the first connector 10 is matched to the position of the corresponding recessed groove portion 112*a* of the second connector 101 and the position of the first protrusion end portion 22 of the first connector 10 is matched to the position of the mating recessed portion 122 corresponding to the second connector 101, completing positioning of the first connector 10 and the second connector 101.

In this state, when the first connector 10 and/or the second connector 101 are moved in a direction approaching the counterpart connector, in other words, in the mating direction (Z axis direction), the first protrusion 12 and the first protrusion end portion 22 of the first connector 10 are inserted into the recessed groove portion 112*a* and the mating recessed portion 122 of the second connector 101. Thus, as illustrated in FIGS. 1, 8A-8C, and 9, the first terminal 61 and the second terminal 161 achieve a conduction state upon completion of the mating between the first connector 10 and the second connector 101.

Specifically, the first terminal 61 of the first connector 10 is inserted between the inner contact portion 165*a* and the outer contact portion 166 of each second terminal 161. The surface 66*a* of the opposing plate portion 66 of the first terminal 61 comes into contact with the inner contact portion 165*a* of the second terminal 161. The surface 65*a* of the first terminal 61 plate portion 65 comes into contact with the outer contact portion 166 of the second terminal 161. As a result, each second terminal 161 and the corresponding first terminal 61 become conductive. More specifically, the surface 66*a* of the first terminal 61 opposing plate portion 66 always contacts the inner contact portion 165*a* of the second terminal 161 but the surface 65*a* of the first terminal 61 plate portion 65 does not necessarily always contact the outer contact portion 166 of the second terminal 161 and may not function as a contact point. In other words, it is sufficient for the protrusion portion 167*b* of the second terminal 161 to be engaged and in contact with the second stepped portion 68*b* of the first terminal 61. The plate portion 65 of the first terminal 61 and outer contact portion 166 of the second terminal 161 do not necessarily need to function as contact points.

As a result, the conductive traces coupled to the connection pads on the first board to which the board connecting portion 62 of the first terminals 61 are connected become conductive with the conductive traces coupled to the connection pads on the second board to which the board connecting portion 162 of the second terminals 161 are connected. Since the protrusion portion 167*b* of the second terminal 161 engages with the second stepped portion 68*b* of the first terminal 61, the bond between the first terminal 61 and the second terminal 161 is ensured, and the mated state of the first connector 10 and the second connector 101 is securely maintained.

In addition, the first protrusion end portion 22 is inserted into the mating recessed portion 122, and the contact arm portion 154 of the second reinforcing metal fitting 151 contacts the side wall outer cover portion 53*c* of the first reinforcing metal fitting 51 side cover portion 53 attached to the first protrusion end portion 22. As a result, the conductive trace coupled to connection pads on the first board to which the side wall board connecting portion 53*d* and the end wall board connecting portion 57*d* of the first reinforcing metal fitting 51 are connected conduct with the conductive trace coupled to connection pads on the second board to which the board connecting portion 153*c* of the connecting arm portion 153 of the second reinforcing metal fitting 151 and the board connecting portion 157*c* of the end wall cover portion 157 are connected.

Incidentally, the first connector 10 and the second connector 101 are mounted on the first board and second board, respectively, which have a large area. Therefore, the operator cannot visually see the mating surface of the first connector 10 and the mating surface of the second connector 101 and must perform a mating operation by feeling. As a result, the position of the first connector 10 and the position of the second connector 101 may be misaligned due to an inability to perform accurate alignment by feeling. For example, the second connector 101 may be displaced in the X-axis direction or the Y-axis direction relative to the first connector 10, and the first protrusion end portion 22 of the first connector 10 may be misaligned with the mating recessed portion 122 of the second connector 101.

In this state, when the operator moves the first connector 10 and/or the second connector 101 in the direction of mating, for example, the first protrusion end portion 22 of the first connector 10 abuts the end wall portion 121*b* or side wall extension 121*c* of the second protrusion end portion 121 of the second connector 101. Therefore, the first protrusion end portion 22 and/or second protrusion end portion 121 receive a strong force. However, as described above, the first reinforcing metal fitting 51 is integrally mounted in the first protrusion end portion 22 of the first connector 10 and the second reinforcing metal fitting 151 is integrally mounted in the second protrusion end portion 121 of the second connector 101. Therefore, the first protrusion end portion 22 and/or second protrusion end portion 121 have high strength and are not damaged or broken.

Next, when releasing the mating of the first connector 10 and the second connector 101 that are mated together, the operator applies a force in the mating release direction that is the direction (Z axis direction) of separating the first connector 10 and/or the second connector 101 from the counterpart side. In other words, a pulling force is applied. In this case, the second connector 101 is lifted up relative to the first connector 10 for removal so the second stepped portion 68*b* applies a pulling force which is a strong upward force (Z axis direction) to the first terminal 61, in particular the plate portion 65, engaged with the protrusion portion 167*b* of the second terminal 161.

As is clearly illustrated in FIG. 4D and the like, the first terminal 61 has a winding shape that proceeds from the outside to the inside of the first housing 11 in the width direction and is then wound, winding upward and winding back in a winding shape. The plate portion 65 is positioned near the tip of the winding shape so a strong pulling force applied in the upward direction acts so as to cause rolling up.

Note that even if the second stepped portion 68*b* is not present, an upward pulling force is applied to the plate portion 65 of the first terminal 61 due to sliding resistance with the second terminal 161; thus, the force acts so as to cause rolling up.

However, in the present Embodiment, the securing portion 67 is connected to the tip (lower end) of the plate portion 65 and the surface of the securing portion 67 is covered by the cover portion 12*c* of the first housing 11. Therefore, the plate portion 65 is securely retained by the first housing 11 and does not roll up.

Moreover, the surface 67*a* of the securing portion 67 is connected to the surface 65*a* of the plate portion 65 connected via the first stepped portion 68*a* and is recessed into the first protrusion 12 so the securing portion 67 becomes embedded in the first protrusion 12 and is strongly retained by this first protrusion 12. Therefore, rolling up of the plate portion 65 is reliably prevented.

Furthermore, the securing portion 67 includes a wide portion 67*c* having a larger dimension in the width direction than the plate portion 65, and the wide portion 67*c* is embedded in the first protrusion 12. In this manner, since the securing portion 67 is retained more firmly by the first protrusion 12, the plate portion 65 is more reliably prevented from rolling up.

In this manner, in the present Embodiment, the first connector 10 includes a first housing 11 composed of an insulating material and a first terminal 61 composed of a conductive material integrated with the first housing 11. Furthermore, the first housing 11 includes a first protrusion 12 that extends in the longitudinal direction of the first connector 10. The first terminal 61 includes a plate portion 65 that extends in the vertical direction of which surface 65*a* is exposed to the outer surface 12*a* that is one side surface of the first protrusion 12; an opposing plate portion 66 that extends in the vertical direction of which surface 66*a* is exposed to the inner surface 12*b* that is the other side surface of the first protrusion 12; a coupling portion 64 that couples the upper end of the plate portion 65 and the upper end of the opposing plate portion 66; and a securing portion 67 connected to the lower end of the plate portion 65. The second stepped portion 68*b* is formed as a stepped portion at the boundary of the surface 65*a* of the plate portion 65 and the surface 64*a* of the coupling portion 64 and the surface 67*a* of the securing portion 67 is covered by the insulating material of the first housing 11.

Thus, though the first connector 10 is small and has a low profile, rolling up of the first terminal 61 will not occur even if a strong pulling force is applied and the second connector 101 can be repeatedly mated and released. In addition, the structure of the first connector 10 can be simplified, cost can be reduced, and reliability can be improved.

Furthermore, the securing portion 67 is thinner than the plate portion 65. Therefore, even if the surface of the cover portion 12*c* of the first housing 11 that covers the securing portion 67 is formed so as to be flush with the other portions of the outer surface 12*a*, the surface 67*a* of the securing portion 67 is covered with a sufficient amount of insulating material and rolling up of the plate portion 65 can reliably be prevented.

Furthermore, the first stepped portion 68*a* is formed as a stepped portion at the boundary of the surface 65*a* of the plate portion 65 and the surface 67*a* of the securing portion 67 and the back surface 65*b* of the plate portion 65 and the back surface 67*b* of the securing portion 67 are formed mutually flush. Therefore, the cover portion 12*c* of the first housing 11 that covers the surface 67*a* of the securing portion 67 can be thickened increasing the strength of the cover portion 12*c*.

Furthermore, the securing portion 67 includes a wide portion 67*c* that has a wider width than the plate portion 65. Thus, the wide portion 67*c* is covered by and engages with the insulating material of the first housing 11, exhibiting an anchor effect.

Furthermore, at least a portion of the wide portion 67*c* gradually increases in width going downwards. Therefore, the shape of the insulating material of the first housing 11 that covers the wide portion 67*c* changes gradually preventing occurrence of stress concentration enabling preventing of damage to the insulating material.

Furthermore, the first terminal 61 includes a board connecting portion 62 extending from the lower end of the opposing plate portion 66 to the outside of the first connector 10 in the width direction. The surface 66*a* of the opposing plate portion 66 is exposed to the inner surface 12*b* of the first protrusion 12 facing inward in the width direction of the first connector 10 and the surface 65*a* of the plate portion 65 is exposed to the outer surface 12*a* of the first protrusion 12 facing outward in the width direction of the first connector 10. In this manner, as viewed from the longitudinal direction of the first housing 11, the first terminal 61 has a winding shape that proceeds from the outside to the inside in the width direction of the first housing 11 and is wound and is then wound upwards and wound back.

Next, Embodiment 2 will be described below. Note that, for portions having the same structure as that of Embodiment 1, descriptions thereof are omitted by giving the same reference numerals thereto. Moreover, descriptions of the same operations and effects as those of Embodiment 1 will be omitted.

Figure 10A:
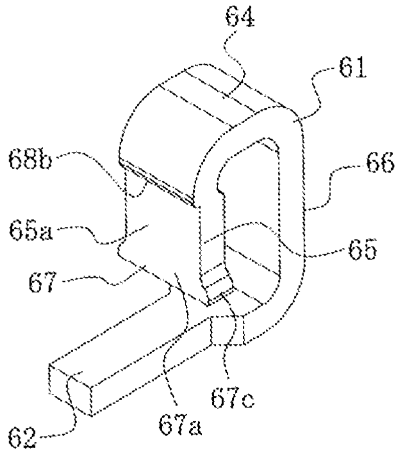
FIGS. 10A-10C are a three-view diagram of the first terminal in Embodiment 2, where
Figure 10B:
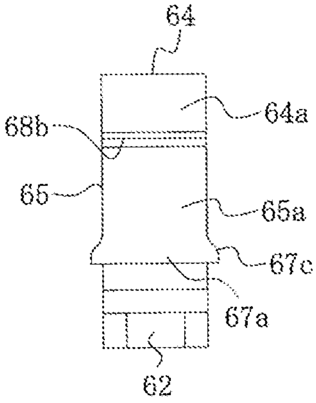
Figure 10C:
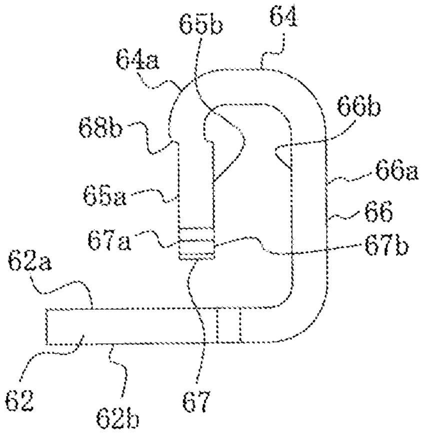

FIGS. 10A-10C are a three-view diagram of the first terminal of Embodiment 2. Note that in the drawing, FIG. 10A is a perspective view, FIG. 10B is a front view, and FIG. 10C is a side view.

In the present Embodiment, similar to Embodiment 1, the first terminal 61 is a member integrally formed by carrying out processing such as punching, bending, or the like of a conductive metal strip and as viewed from the longitudinal direction of the first housing 11, has a winding shape proceeding from the outside to the inside in the width direction of the first housing 11, then winding upwards and winding back.

Furthermore, the first terminal 61 includes:

- a plate portion 65 that functions as an external connecting portion and extends in the vertical direction;
- an opposing plate portion 66, that is opposite the plate portion 65, that functions as an inner contact portion, and extends in the vertical direction of the first housing 11; a coupling portion 64 having both bent ends thereof connected to the upper ends of the plate portion 65 and the opposing plate portion 66; and
- a board connecting portion 62 that extends in the width direction of the first housing 11 and a first bent end thereof is connected to the lower end of the opposing plate portion 66. In addition, a securing portion 67 is connected to the tip (lower end) of the plate portion 65.

However, with the first terminal 61 of the present Embodiment, the securing portion 67 is formed having the same width as the plate portion 65 and as a result, there is no first stepped portion 68*a* between, in other words at the boundary of, the surface 65*a* of the plate portion 65 and the surface 67*a* of the securing portion 67.

Note that the basic configuration of other points of the first terminal 61 in the present embodiment are the same as that of Embodiment 1 described above; therefore, a description thereof is omitted.

In addition, the basic configuration of the first connector 10 and the second connector 101 in the present embodiment are the same as that of Embodiment 1 described above; therefore, a description thereof is omitted.

Furthermore, the operation of mating and the operation of releasing the first connector 10 and the second connector 101 of the present Embodiment as well as the basic configuration of the first connector 10 and the second connector 101 in a mated state are similar to the state in Embodiment 1 so a description thereof is omitted.

Next, Embodiment 3 will be described. Note that, for those having the same structure as those of Embodiments 1 and 2, descriptions thereof are omitted by giving the same reference numerals thereto. Moreover, descriptions of the same operations and effects as those of Embodiments 1 and 2 will be omitted.

Figure 11A:
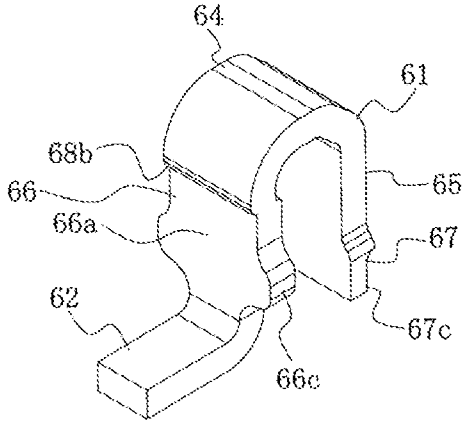
FIGS. 11A-11C are a three-view diagram of the first terminal in Embodiment 3, where
Figure 11B:
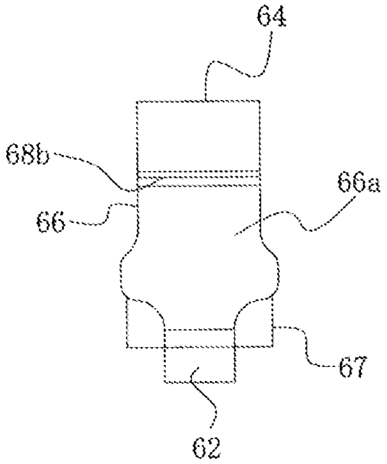
Figure 11C:
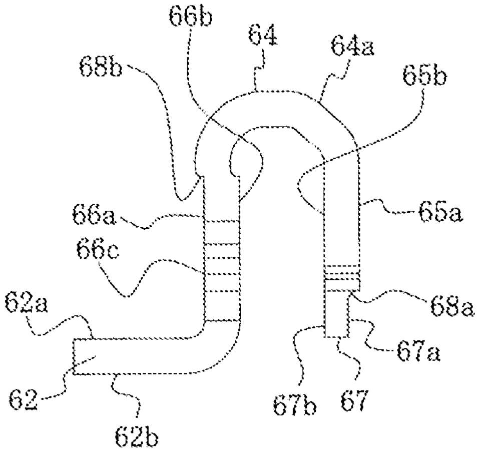
Figure 12A:
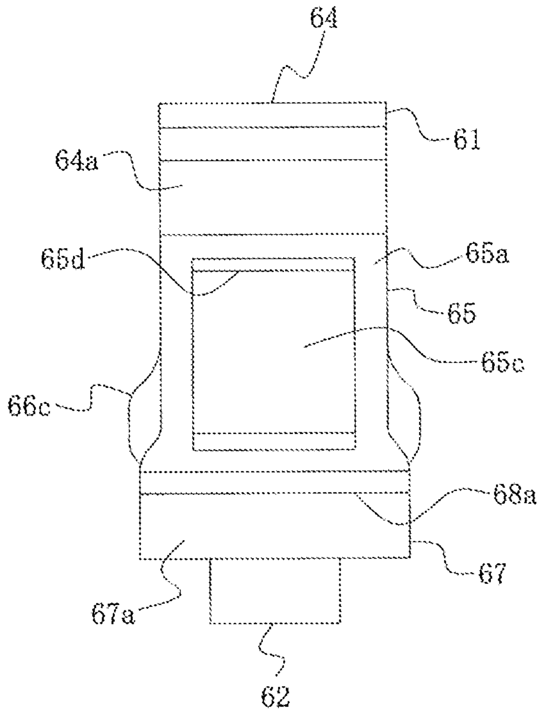
FIGS. 12A and 12B are a two-view diagram of the first terminal in Embodiment 3, where
Figure 12B:
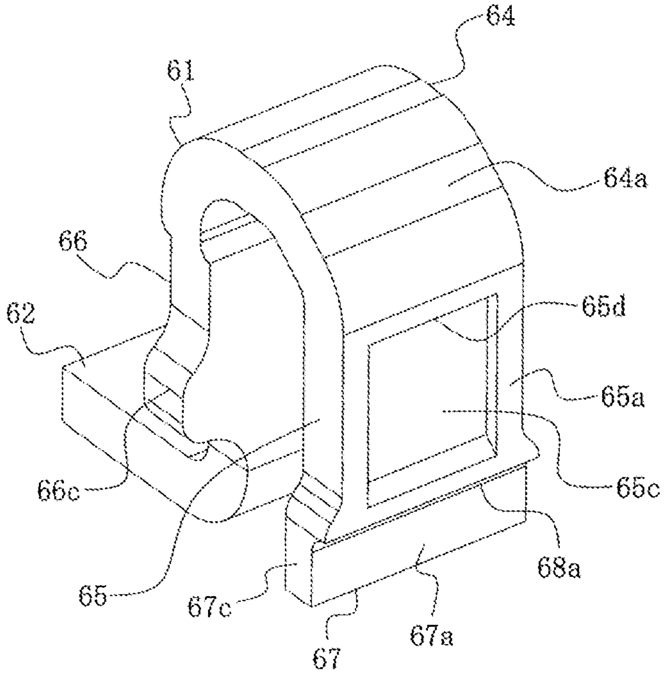
Figure 13A:
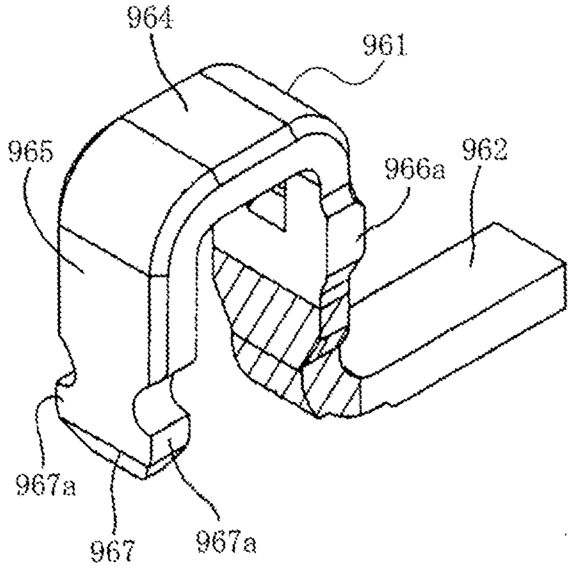
FIGS. 13A and 13B are perspective views illustrating a conventional terminal, where
Figure 13B:
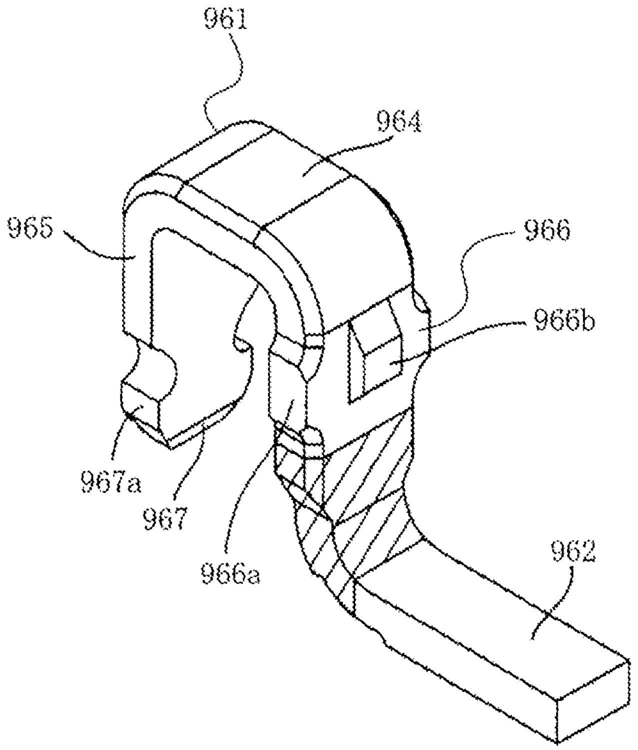

FIGS. 11A-11C are a three-view diagram of the first terminal of Embodiment 3. FIGS. 12A and 12B are a two-view diagram of the first terminal of Embodiment 3. Note that FIG. 11A is a perspective view, FIG. 11B is a front view, and FIG. 11C is a side view. FIG. 12A is a back surface view and FIG. 12B is a perspective view from a different angle.

In the present Embodiment, similar to Embodiment 1, the first terminal 61 is a member integrally formed by carrying out processing such as punching, bending, or the like of a conductive metal strip but the winding direction of the winding shape is different. In addition, in Embodiment 1 described above, the surface 65*a* of the plate portion 65 is exposed to the outer surface 12*a* of the first protrusion 12 and the surface 66*a* of the opposing plate portion 66 is exposed to the inner surface 12*b* of the first protrusion 12 but in the present Embodiment, the surface 65*a* of the plate portion 65 is exposed to the inner surface 12*b* of the first protrusion 12 and the surface 66*a* of the opposing plate portion 66 is exposed to the outer surface 12*a* of the first protrusion 12.

An elongated strip member that constitutes the first terminal 61 of the present Embodiment is extended from the tip of the board connecting portion 62 (outer edge of the first housing 11 in the width direction) positioned more to the outside than the outer surface 12*a* of the first protrusion 12 to the outer surface 12*a*, is bent roughly 90 degrees, is extended from the lower end to the upper end of the opposing plate portion 66, is bent roughly 90 degrees at this upper end, is extended toward the inside of the first housing 11 in the width direction as a coupling portion 64, is bent roughly 90 degrees, is extended from the upper end to the lower end of the plate portion 65, and then is bent. In other words, the first terminal 61, as viewed from the longitudinal direction of the first housing 11, has a winding shape that proceeds inwards from the outside in the width direction of the first housing 11 and then winds around and a winding shape that winds upward and then winds forward.

In addition, similar to Embodiment 1 described above, a securing portion 67 is connected to the tip (lower end) of the plate portion 65. Furthermore, similar to Embodiment 1, the securing portion 67 is formed thinner than the plate portion 65 and a first stepped portion 68*a* is formed between, in other words at the boundary of, the surface 65*a* of the plate portion 65 and the surface 67*a* of the securing portion 67.

However, with the present embodiment, the second stepped portion 68*b* is formed at the boundary between the surface 66*a* of the opposing plate portion 66 and the surface 64*a* of the coupling portion 64 rather than at the boundary of the surface 65*a* of the plate portion 65 and the surface 64*a* of the coupling portion 64. In addition, the opposing plate portion 66 includes a wide portion 66*c* with a dimension in the width direction larger than that of the opposing plate portion 66. Furthermore, a recessed portion 65*c* that is recessed in the thickness direction is formed in the surface 65*a* of the plate portion 65. When the first connector 10 is mated with the second connector 101, the recessed portion 65*c* contacts the inner contact portion 165*a* of the second terminal 161 and functions as a contact point. Note that an upper end 65*d* of the recessed portion 65*c* is positioned at the boundary of the surface 65*a* of the plate portion 65 and the surface 64*a* of the coupling portion 64, functions as a second stepped portion, and is engaged by the inner contact portion 165*a* of the second terminal 161 in the case where the mating of the first connector 10 and the second connector 101 is released.

In this manner, with the present Embodiment, the first terminal 61 includes the board connecting portion 62 that extends from the lower end of the opposing plate portion 66 to the outside of the first connector 10 in the width direction. The surface 66*a* of the opposing plate portion 66 is exposed to the outer surface 12*a* of the first protrusion 12 that faces outward in the width direction of the first connector 10 and the surface 65*a* of the plate portion 65 is exposed to the inner surface 12*b* of the first protrusion 12 that faces inward in the width direction of the first connector 10. In other words, the first terminal 61, as viewed from the longitudinal direction of the first housing 11, has a winding shape that proceeds inwards from the outside in the width direction of the first housing 11 and then winds around and a winding shape that winds upward and then winds forward.

Note that the basic configuration of other points of the first terminal 61 in the present embodiment are the same as that of Embodiment 1 and 2 described above; therefore, a description thereof is omitted.

In addition, the basic configuration of the first connector 10 and the second connector 101 in the present embodiment are the same as that of Embodiment 1 and 2 described above; therefore, a description thereof is omitted.

Furthermore, the operation of mating and the operation of releasing the first connector 10 and the second connector 101 of the present Embodiment as well as the basic configuration of the first connector 10 and the second connector 101 in a mated state are similar to the state in Embodiment 1 and 2 so a description thereof is omitted.

Note that the disclosure herein describes features relating to suitable exemplary embodiments. Various other embodiments, modifications, and variations within the scope and spirit of the claims appended hereto will naturally be conceived of by those skilled in the art upon review of the disclosure herein.

The present disclosure can be applied to a connector.

The invention claimed is:

1. A connector comprising:

a housing formed of an insulating material, the housing including a protrusion extending in a longitudinal direction, the protrusion having first and second side surfaces extending in the longitudinal direction; and a terminal formed of a conductive material, the terminal including a plate portion extending in a vertical direction, the plate portion having upper and lower ends and front and rear edges and having first and second side surfaces extending therebetween, wherein the second side surface faces the first side surface of the protrusion, wherein a length of the plate portion is defined in the longitudinal direction and between the front and rear edges and a width of the plate portion is defined in a lateral direction which is transverse to the longitudinal direction and between the first and second side surfaces, an opposing plate portion extending in the vertical direction, the opposing plate portion having upper and lower ends and first and second side surfaces extending therebetween, wherein the second side surface of the opposing plate portion faces the second side surface of the protrusion, a coupling portion coupling the upper ends of the plate portion and the opposing plate portion, the coupling portion having first and second surfaces, a securing portion extending from the lower end of the plate portion, the securing portion having upper and lower ends and front and rear edges and having first and second side surfaces extending therebetween, wherein a length of the securing portion is defined in the longitudinal direction and between the front and rear edges thereof and a width of the securing portion is defined in the lateral direction and between the first and second side surfaces thereof, and wherein the securing portion is embedded into the insulating material of the housing such that the lower end, the front and rear edges and the first and second side surfaces of the securing portion are covered by the insulating material of the housing, and a stepped portion is provided between at least one of (a) the first side surface of the plate portion and the first surface of the coupling portion such that the first side surface of the plate portion is offset in the lateral direction from the first surface of the coupling portion and (b) the first side surface of the plate portion and the first side surface of the securing portion such that the first side surface of the securing portion is offset in the lateral direction from the first side surface of the plate portion.

2. The connector according to claim 1, wherein the width of the securing portion is thinner than the width of the plate portion.

3. A connector pair, comprising the connector according to claim 2 and a counterpart connector configured to mate with the connector.

4. The connector according to claim 2, the terminal further comprises a second stepped portion between the first side surface of the plate portion and the first side surface of the securing portion thereby forming a step, wherein the second side surfaces of the plate portion and the securing portion are formed in the same plane.

5. A connector pair, comprising the connector according to claim 4 and a counterpart connector configured to mate with the connector.

6. The connector according to claim 1, wherein the securing portion includes a long portion having a length which is wider than the length of the plate portion.

7. A connector pair, comprising the connector according to claim 6 and a counterpart connector configured to mate with the connector.

8. The connector according to claim 6, wherein at least a portion of the long portion gradually increases in length going downwards.

9. A connector pair, comprising the connector according to claim 8 and a counterpart connector configured to mate with the connector.

10. The connector according to claim 1, wherein the terminal further comprises a board connecting portion extending from the lower end of the opposing plate portion in the lateral direction.

11. A connector pair, comprising the connector according to claim 10 and a counterpart connector configured to mate with the connector.

12. The connector according to claim 10, wherein the at least one stepped portion is positioned vertically over the board connecting portion.

13. A connector pair, comprising the connector according to claim 12 and a counterpart connector configured to mate with the connector.

14. The connector according to claim 10, wherein the plate portion, the opposing plate portion and the coupling portion have lengths which are the same, and a portion of the board connecting portion has a length which is narrower than the lengths of the plate portion, the opposing plate portion and the coupling portion.

15. A connector pair, comprising the connector according to claim 14 and a counterpart connector configured to mate with the connector.

16. The connector according to claim 10, wherein the at least one stepped portion is not positioned vertically over the board connecting portion.

17. A connector pair, comprising the connector according to claim 16 and a counterpart connector configured to mate with the connector.

18. A connector pair, comprising the connector according to claim 1 and a counterpart connector configured to mate with the connector.

19. A connector pair, comprising the connector according to claim 18 and a counterpart connector configured to mate with the connector.

* * * * *